US006616776B1

(12) United States Patent
Ahmadi et al.

(10) Patent No.: US 6,616,776 B1
(45) Date of Patent: Sep. 9, 2003

(54) METHOD FOR REMOVING ENGINE DEPOSITS IN A RECIPROCATING INTERNAL COMBUSTION ENGINE

(75) Inventors: Majid R. Ahmadi, Pleasant Hill, CA (US); Damon C. Vaudrin, Vacaville, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 0 days.

(21) Appl. No.: 10/289,799

(22) Filed: Nov. 6, 2002

(51) Int. Cl.[7] .............................. B08B 3/04; C11D 7/26; C11D 7/32; C11D 7/50
(52) U.S. Cl. ............................ 134/40; 134/39; 134/42; 510/187; 510/421; 510/499; 510/505; 510/506
(58) Field of Search ................................. 510/187, 421, 510/499, 505, 506; 134/39, 40, 42

(56) References Cited

U.S. PATENT DOCUMENTS

| | | | | |
|---|---|---|---|---|
| 4,584,117 A | * | 4/1986 | Wollenberg | 252/51.5 |
| 4,671,230 A | | 6/1987 | Turnipseed | |
| 4,680,133 A | * | 7/1987 | Ward | 252/153 |
| 4,784,170 A | | 11/1988 | Romanelli et al. | |
| 4,800,848 A | | 1/1989 | Hubbard | |
| 4,807,578 A | | 2/1989 | Adams et al. | |
| 4,881,945 A | | 11/1989 | Buckley, III | |
| 4,927,551 A | * | 5/1990 | Erdman et al. | 252/42.7 |
| 4,989,561 A | | 2/1991 | Hein et al. | |
| 4,992,187 A | | 2/1991 | Adams et al. | |
| 5,097,806 A | | 3/1992 | Vataru et al. | |
| 5,257,604 A | | 11/1993 | Vataru et al. | |
| 5,334,321 A | * | 8/1994 | Harrison et al. | 252/51.5 |
| 5,334,331 A | * | 8/1994 | Fusiak | 252/542 |
| 5,503,683 A | | 4/1996 | Butcher et al. | |
| 5,665,690 A | * | 9/1997 | Lucas et al. | 510/407 |
| 5,669,939 A | | 9/1997 | Cherpeck | |
| 5,749,929 A | | 5/1998 | Cherpeck et al. | |
| 5,853,434 A | * | 12/1998 | Harrison et al. | 44/331 |
| 5,858,942 A | | 1/1999 | Adams et al. | |
| 6,073,638 A | | 6/2000 | Sasaki et al. | |
| 6,162,769 A | * | 12/2000 | Polhaar et al. | 508/339 |
| 6,192,901 B1 | | 2/2001 | Rome et al. | |
| 6,203,584 B1 | | 3/2001 | Fuentes-Afflick et al. | |
| 6,217,624 B1 | | 4/2001 | Morris et al. | |
| 6,239,090 B1 | * | 5/2001 | Marquis et al. | 510/201 |
| 6,479,445 B1 | * | 11/2002 | Machac, Jr. et al. | 510/206 |

FOREIGN PATENT DOCUMENTS

| | | |
|---|---|---|
| WO | WO 90/10051 | 9/1990 |
| WO | WO 92/07176 | 4/1992 |
| WO | WO 00/20537 | 4/2000 |
| WO | WO 00/33981 | 6/2000 |

OTHER PUBLICATIONS

S. Matsushita, "Development of Direct Injection S.I. Engine (D–4)", Proceedings of JSAE (Japanese Society of Automotive Engineers), No. 9733440, pp 33–38, Mar. 1997.

* cited by examiner

Primary Examiner—Gregory Delcotto
(74) Attorney, Agent, or Firm—Joseph P. Foley; Claude J. Caroli

(57) ABSTRACT

Disclosed are methods for removing engine deposits in a recprocating internal combustion engine by introducing a cleaning composition into an air-intake manifold of a warmed-up and idling reciprocating internal combustion engine and running the engine while the cleaning composition is being introduced. One such cleaning composition suitable for these methods comprises a first solution containing a mixture of: (a) a phenoxy mono- or poly (oxyalkylene) alcohol; (b) at least one solvent selected from (1) an alkoxy mono- or poly(oxyalkylene) alcohol and (2) an aliphatic or aromatic organic solvent; and (c) at least one nitrogen-containing detergent additive; and a second solution containing a mixture of: (d). a phenoxy mono- or poly(oxyalkylene) alcohol; (e) a cyclic carbonate; and (e) water.

27 Claims, No Drawings

METHOD FOR REMOVING ENGINE DEPOSITS IN A RECIPROCATING INTERNAL COMBUSTION ENGINE

BACKGROUND OF THE INVENTION

1. Field of the invention

This invention relates to a cleaning composition for removing carbonaceous deposits and to methods for removing engine deposits in a reciprocating internal combustion engine. More particularly, this invention relates to a method for removing engine deposits in a reciprocating internal combustion engine which comprises introducing a two part cleaning composition into an air-intake manifold of the engine and running the engine while the cleaning composition is being introduced.

2. Description of the Related Art

It is well known that reciprocating internal combustion engines tend to form carbonaceous deposits on the surface of engine components, such as carburetor ports, throttle bodies, fuel injectors, intake ports and intake valves, due to the oxidation and polymerization of hydrocarbon fuel, exhaust gas recirculation (EGR), positive crankcase ventilation (PCV) gases. It is believed that some of the unburnt hydrocarbons in the fuel undergoes complex cracking, polymerization and oxidation reactions, leading to reactive moieties which can interact with the fuel, recirculated gases and lubricating oils; thus forming insolubles in the combustion chamber and combustion pathways. These deposits, even when present in relatively minor amounts, often cause noticeable operational performance issues such as driveability problems including stalling and poor acceleration, loss of engine performance, increased fuel consumption and increased production of exhaust pollutants.

Fuel based detergents and other additive packages have been developed, primarily in gasoline fuels to prevent the formation of unwanted deposits. As a consequence, problems in fuel delivery systems, including injector deposit problems, have been significantly reduced. However, even after employing these detergent additives injectors and other components require occasional additional cleaning to maintain optimum performance. The present additives are not completely successful eliminating deposits, especially for removing preexisting heavy deposits or deposits upstream of the fuel entry. Often these preexisting and upstream deposits require complete engine tear down. Attempts have been made to use higher concentrations of detergents and additives in the fuel. However since these detergents are mixed with the fuel they are generally employed at concentrations less than 1% primarily for compatibility with elastomers, seals, hoses and other components in the fuel system. Moreover, for these detergent additives in the fuel to remove deposits from the various parts of an engine, they needed to come into contact with the parts that require cleaning.

Specific engine configurations have more pronounced problematic deposit areas due to the intake systems. For example, throttle body style fuel injector systems where the fuel is sprayed at the initial point of air flow into the system allows the intake to remain reasonably clean using the fuel additive, however port fuel injection spark ignition (PFI SI) engines spray the fuel directly into the air stream just before the intake valves and direct injection spark ignition (DISI) engines spray the fuel directly into the combustion chamber. As a result, upstream components from the fuel entry on the intake manifold of PFI SI and DISI engines are subject to increased formation of unwanted deposits from oil from the positive crankcase ventilation (PCV) system and exhaust gas recirculation (EGR). These upstream engine air flow components can remain with engine deposits even though a detergent is used in the fuel. Even with the use of detergents, some engine components when present, such as intake valves, fuel injector nozzles, idle air bypass valves, throttle plates, EGR valves, PCV systems, combustion chambers, oxygen sensors, etc., require additional cleaning.

New engine technologies designed to deliver maximum fuel efficiency, are more susceptible to deposit build up. In particular, engines such as direct injection spark ignition as well as modern diesel engines using high exhaust gas recirculation ratios to achieve lower $NO_x$, form significant intake system deposits and since fuel delivery takes place inside the combustion chamber, these engines do not benefit from fuel based deposit control additives for intake system deposit removal.

Recently, direct injection spark ignition (DISI) engines have been introduced as an alternative to conventional port fuel injection spark ignition (PFI SI) engines. In the past few years, at least three types of DISI engines (from Mitsubishi, Toyota, and Nissan) have been commercially introduced into the Japanese market, and some models are now available in Europe and selected markets in Asia. Interest in these engines stems from benefits in the area of fuel efficiency and exhaust emissions. The direct injection strategy for spark ignition engines has allowed manufacturers to significantly decrease engine fuel consumption, while at the same time maintaining engine performance characteristics and levels of gaseous emissions. The fuel/air mixture in such engines is often lean and stratified (as opposed to stoichiometric and homogeneous in convention PFI SI engines), thus resulting in improved fuel economy.

Although there are many differences between the two engine technologies, the fundamental difference remains fuel induction strategy. In a traditional PFI SI engine, fuel is injected inside the intake ports, coming in direct contact with the intake valves, while in DISI engines fuel is directly introduced inside the combustion chamber. Recent studies have shown that DISI engines are prone to deposit build up and in most cases, these deposits are hard to remove using conventional deposit control fuel additives. Given that the DISI engine technology is relatively new, there is concern that with accumulated use, performance and fuel economy benefits may diminish as deposits form on various surfaces of these engines. Therefore, the development of effective fuel detergents or "deposit control" additives and methods to deliver these cleaning solutions to the intake systems, thus preventing or reducing such deposits in DISI engines is of considerable importance.

In addition, advances have been made in diesel engines such as the use of low sulfur fuels, use of exhaust gas recirculation (EGR) and other engine treatment systems have tended to form more tenacious and difficult to remove deposits, while at the same time requiring higher levels of engine cleanliness for operation of these systems. The EGR and PCV gases as well as blow back gases during valve overlap contribute to intake system deposit formation. These deposits can not be removed from fuel-based deposit control additives. As a result, a different method of deposit removal is required in these engine technologies. DISI engines and gaseous fueled engines (e.g., natural gas engines) also require a similar deposit removal technique. Furthermore, increased reliance on alternative fuels such as hydrogen, natural gas and other hydrocarbon based fuels has also lead to the need for new compositions for cleaning the resulting carbonaceous deposits due to the combustion of these fuels.

Accordingly, disclosed herein is a method for removing engine deposits in reciprocating engines which does not require complete disassembly of the engine and suitable for different engine types. This method can be used in gasoline, diesel, and natural gas internal combustion engines by introducing a novel cleaning composition comprising a first and second solution, into the air intake manifold of a warmed up and operating internal combustion engine, thereby removing carbonaceous deposits.

SUMMARY OF THE INVENTION

The present invention provides a method for administering a cleaning composition to remove carbonaceous deposits in a reciprocating internal combustion engine. More particularly, this invention relates to a method for removing engine deposits in a reciprocating internal combustion engine which comprises introducing a cleaning composition into an air-intake manifold of a warmed up and idling engine and running the engine while the cleaning composition is being introduced, said cleaning composition comprising:
a first solution comprising a mixture of:
(a) a phenoxy mono- or poly(oxyalkylene) alcohol having the formula:

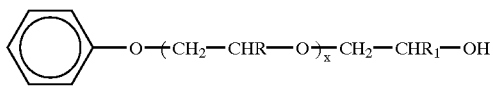

(I)

wherein R and $R_1$ are independently hydrogen or methyl and each R is independently selected in each —$CH_2$—CHR—O— unit; and x is an integer from 0 to 4; and mixtures thereof;
(b) at least one solvent selected from:
(1) an aliphatic alcohol; and
(2) an aliphatic or aromatic organic solvent; and
(c) at least one nitrogen-containing detergent additive; and
a second solution comprising a mixture of:
(d) a phenoxy mono- or poly(oxyalkylene) alcohol having the formula:

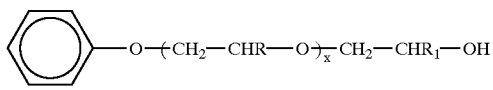

(I)

wherein R and $R_1$ are independently hydrogen or methyl and each R is independently selected in each —$CH_2$—CHR—O— unit; and x is an integer from 0 to 4; or mixtures thereof;
(e) a cyclic carbonate; and
(f) water.

The first and second solutions are homogeneous as separate solutions and can be administered sequentially, such as the first solution followed there after by the second solution, or concurrently when mixed together prior to use.

Accordingly, the method can further comprise mixing the first cleaning solution with the second cleaning solution prior to introducing said cleaning solution to the air intake manifold. The mixture should be sufficiently agitated to form an emulsion which is substantially stable over the delivery period. In an alternative embodiment, the present invention is further directed to a method for delivering a cleaning composition to the intake system of a reciprocating internal combustion engine which comprises introducing a cleaning composition into an air-intake manifold of a warmed-up and idling internal combustion engine through a transport means inserted into and located within the interior of the engine to thereby deliver the cleaning composition to each combustion chamber, and running the engine while the cleaning composition is being introduced. This transport means is separate from the fuel delivery system of the engine. This invention is also directed to a kit of component parts for a carbonaceous cleaning composition capable of being administered to an intake manifold of a reciprocating internal combustion engine comprising a first container holding a solution comprising a mixture of (a), (b), and (c) described above; and a second container holding a solution comprising a mixture of (d), (e) and optionally (f) since this can be added later.

Among other factors, the present invention is based on the discovery that intake system deposits, particularly intake valve deposits, combustion cylinder deposits, and combustion chamber deposits, can be effectively removed in reciprocating internal combustion engines by employing the cleaning composition and the unique method described herein. Moreover, the method of the present invention is suitable for use in removing deposits in conventional gasoline engines including conventional port fuel injection spark ignition (PFI SI) engines and in direct injection spark ignition (DISI) gasoline engines. The present method is especially suitable for use in DISI gasoline engines. In another aspect, diesel engines and alternative fuel engines such as natural gas engines, including CNG and LPG engines, and hydrogen fueled engines can be cleaned using the present method. Such deposit removal is not limited to certain type or class of engine as this method and formulation of the cleaning composition will effectively remove deposits form a wide variety of two stroke and four stroke internal combustion engines such as PFI, DISI, diesel, marine, and natural gas engines and their accessories such as turbochargers, rotary and reciprocating pumps and turbines.

DETAILED DESCRIPTION OF THE INVENTION

Carbon deposit build up inside internal combustion engines is a major source of customer complaints to manufacturers and service centers: These deposits often result in driveability problems, loss of engine performance and increased tailpipe exhaust emissions. New engine technologies, designed to deliver maximum fuel efficiency, are more susceptible to deposit build up. In particular, engines such as Direct Injection Spark Ignition (DISI) engines as well as modern diesel engines using high EGR ratio to achieve lower $NO_x$ will not benefit from fuel-based deposit control additives. The main reason being that in these engine environments, fuel is directly injected inside the combustion chamber and deposit control fuel additives will not have a significant impact on removing the critical intake system deposits. Additionally, deposit formation in gaseous fueled engines such as natural gas engines has been known to result in costly repairs. In response to these market opportunities, this invention is directed to the tools, procedures, and formulations that when applied by a trained technician, will remove a great fraction of these unwanted deposits in a short time, thus eliminating a significant fraction of the cost associated with disassembling the engine in order to physically remove these deposits.

Therefore, a suitable cleaning composition comprising a first solution mixture and a second solution mixture (detailed below) was developed and tested in a wide variety of internal combustion engines to quickly and effectively remove deposits from critical internal surfaces of these engines. Such a deposit removal application is not limited to certain type or class of engines as this cleaning composition will effectively remove deposits from a wide variety of two stroke and four stroke internal combustion engines such as PFI, DISI, diesel, marine, and natural gas engines and their accessories such as turbochargers, rotary and reciprocating pumps and turbines.

In one embodiment, the method of the present invention comprises introducing a cleaning composition into an air-intake manifold of a previously warmed-up and idling reciprocating internal combustion engine and running the engine while the cleaning composition is being introduced, wherein the cleaning composition comprises a first and second solution. The first solution comprises a mixture of (a) a phenoxy mono- or poly(oxyalkylene) alcohol, (b) at least one solvent selected from (1) an aliphatic alcohol, and (2) an aliphatic or aromatic organic solvent, and (c) at least one nitrogen-containing detergent additive. The second solution comprises a mixture of (d) a phenoxy mono- or poly (oxyalkylene) alcohol, (e) a cyclic carbonate, and (f) water. The components of the cleaning solution are further defined below.

The Phenoxy Mono- or Poly(oxyalkylene) Alcohol

The phenoxy mono- or poly(oxyalkylene) alcohol component of the cleaning composition employed in the present invention has the following general formula:

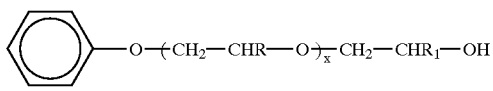

(I)

wherein R and $R_1$ are independently hydrogen or methyl and each R is independently selected in each —$CH_2$—CHR—O— unit; and x is an integer from 0 to 4; and mixtures thereof.

In Formula 1 above, R and $R_1$ are preferably hydrogen and x is preferably an integer from 0 to 2. More preferably, R and $R_1$ are hydrogen and x is 0.

Suitable phenoxy mono- or poly(oxyalkylene) alcohols for use in the present invention include, for example, 2-phenoxyethanol, 1-phenoxy-2-propanol, diethylene glycol phenyl ether, propylene ethylene glycol phenyl ether, dipropylene glycol phenyl ether, and the like, including mixtures thereof. A preferred phenoxy mono- or poly(oxyalkylene) alcohol is 2-phenoxyethanol. A commercial 2-phenoxyethanol is available from Dow Chemical Company as EPH Dowanol.

The Solvent

The solvent component of the cleaning composition employed in the present invention is at least one solvent selected from (1) an aliphatic alcohol, and (2) an aliphatic and/or aromatic organic solvent. More than one solvent can be employed in the formulation such as mixtures of aliphatic alcohols, mixtures of aliphatic organic solvents, mixtures of aromatic solvents. At least one solvent also includes mixtures of aliphatic alcohol(s) with aliphatic organic solvent(s), mixtures of aliphatic alcohol(s) with aromatic organic solvent(s), mixtures of aliphatic alcohol(s) with aliphatic organic solvent(s) and aromatic organic solvent(s), and well as mixtures of aliphatic organic solvent(s) with aromatic organic solvent(s).

1. The Aliphatic Alcohol

The aliphatic alcohols are selected from an aliphatic or aryl-substituted aliphatic alcohol having a total of 4 to 30 carbon atoms. The aliphatic alcohol includes linear or branched chain aliphatic groups and can form primary, secondary and tertiary alcohols. Preferably the aliphatic alcohols contain from 6 to 20 carbon atoms and most preferably from 7 to 15 carbon atoms. The aliphatic alcohols can be substituted with aryl groups of 6 to 9 carbon atoms and more preferred is a phenyl group. Preferred are lower alcohols are octyl, decyl, dodecyl, tetradecyl, hexadecyl, as well as branched chain alcohols etc. Especially preferred is ethyl hexanol and more particularly 2-ethyl hexanol.

The alcohols can be mixtures of molecular weights and of various chain branching. Examples of commercially available primarily linear alcohols include Alfol 810 (a mixture of primarily straight chain, primary alcohols having from 8 to 10 carbon atoms); Alfol 1218 (a mixture of synthetic, primary, straight-chain alcohols containing 12 to 18 carbon atoms); Alfol 20+ alcohols (mixtures of $C_{18}$–$C_{28}$ primary alcohols having mostly $C_{20}$ alcohols as determined by GLC (gas-liquid-chromatography)); and Alfol 22+ alcohols ($C_{18}$–$C_{28}$ primary alcohols containing primarily $C_{22}$ alcohols). Alfol alcohols are available from Continental Oil Company.

Suitable branched alcohol(s) may be selected from the following group: tert-amyl alcohol, 2-methyl-1-butanol, 3-methyl-1-butanol, neopentyl alcohol, 3-methyl-2-butanol, 2-pentanol, 3-pentanol, 2,3-dimethyl-2-butanol, 3,3-dimethyl-1-butanol, 3,3-dimethyl-2-butanol, 2-ethyl-2-butanol, 2-hexanol, 3-hexanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 2-(2-hexyloxyethoxy)ethanol, tert-butyl alcohol, 2,2-dimethyl-3-pentanol, 2,3-dimethyl-3-pentanol, 2,4-dimethyl-3-pentanol, 4,4-dimethyl-3-pentanol, 3-ethyl-3-pentanol, 2-heptanol, 3-heptanol, 2-methyl-2-hexanol, 2-methyl-3-hexanol, 5-methyl-2-hexanol, 2-ethyl-1-hexanol, 4-methyl-3-heptanol, 6-methyl-2-heptanol, 2-octanol, 3-octanol, 2-propyl-1-pentanol, 2,4,4-trimethyl-1-pentanol, 2,6-dimethyl-4-heptanol, 3-ethyl-2,2-dimethyl-3-pentanol, 2-nonanol, 3,5,5-trimethyl-l-hexanol, 2-decanol, 4-decanol, 3,7-dimethyl-1-octanol, 3,7-dimethyl-3-octanol, 2-dodecanol, and 2-tetradodecanol.

Examples of commercially available branched chain primary alcohols can be produced by catalytic hydroformation or carbonylation of higher olefins feed stocks, as an example "EXXAL 12" dodecyl alcohol available from ExxonMobile is a mixture of $C_{10}$–$C_{14}$ primary alcohols. Suitable Exxal alcohols include Exxal 7 through Exxal 13, and include isoheptyl, isooctyl, isononyl, decyl, nonyl, dodecyl and tridecyl alcohols. These commercial mixtures of branched alcohols such as the following alcohols are Exxal 7 (a mixture of branched heptyl alcohols), Exxal 8 (a mixture of branched octyl alcohols), Exxal 9 (a mixture of branched nonyl alcohols), Exxal 10 (a mixture of branched decyl alcohols), Exxal 11 (a mixture of branched nonyl alcohols), Exxal 12 (a mixture of branched dodecyl alcohols), and Exxal 13 (a mixture of branched tridecyl alcohols).

Another example of a commercially available alcohol mixtures are Adol 60 (about 75% by weight of a straight chain $C_{22}$ primary alcohol, about 15% of a $C_{20}$ primary alcohol and about 8% of $C_{18}$–$C_{24}$ alcohols) and Adol 320 (oleyl alcohol). The Adol alcohols are marketed by Ashland Chemical. Another group of commercially available mixtures include the "Neodol" products available from Shell Chemical Co. For example, Neodol 23 is a mixture of $C_{12}$ and $C_{13}$ alcohols; Neodol 25 is a mixture of $C_{12}$ and $C_{15}$ alcohols; and Neodol 45 is a mixture of $C_{14}$ to $C_{15}$ linear alcohols. Neodol 91 is a mixture of $C_9$, $C_{10}$ and $C_{11}$ alcohols. A variety of mixtures of monohydric fatty alcohols derived from naturally occurring triglycerides and ranging in chain length of from about $C_8$ to $C_{18}$ are available from Procter & Gamble Company. These mixtures contain various amounts of fatty alcohols containing mainly 12,14,16, or 18 carbon atoms. For example, CO-1214 is a fatty alcohol mixture containing 0.5% of $C_{10}$ alcohol, 66.0% of $C_{12}$ alcohol, 26.0% of $C_{14}$ alcohol and 6.5% of $C_{16}$ alcohol.

Suitable aryl substituted aliphatic alcohols are selected from aryl groups having 6 to 9 carbon atoms and wherein the hydroxyl group is attached to the aliphatic moiety. Preferred aryl substituted aliphatic alcohols are benzyl alcohol, alpha and beta phenylethyl alcohol, di- and tri-phenylmethanol. Most preferred is benzyl alcohol.

2. The Aliphatic or Aromatic Organic Solvent

An aliphatic or aromatic hydrocarbyl organic solvent may also be employed in the present invention. Suitable aliphatic solvents include dearomatized solvents, such as Exxsol D40 and D60, available from ExxonMobil, other aliphatic solvents, such as D15–20 Naphta, D115–145 Naphta and D31–35 Naphta, also available from ExxonMobil, and non-aromatic mineral spirits, and the like.

Suitable aromatic solvents include benzene, toluene, xylene or higher boiling aromatics or aromatic thinners, such as a $C_9$ aromatic solvent. A preferred solvent for use in the present invention is a $C_9$ aromatic solvent. This includes mixtures of $C_9$ aromatics such as trimethyl benzene and ethyl toluene or propyl benzene which exhibit good solvency and compatibility with fuels. Other aromatic petroleum distillates may also be used, and preferably they are not classified as volatile organic compounds. Preferred aromatic petroleum distillates are naphthalene depleted (i.e. contain less than about 1% by weight naphthalene) since naphthalene may be classified as a hazardous air pollutant. Suitable aromatic petroleum distillates are commercially available as AROMATIC 100, 150, 200 from ExxonMobil.

Preferably, the solvent employed will be a mixture of both an aliphatic alcohol and an aliphatic or aromatic organic solvent. In a particularly preferred embodiment, the solvent will be a mixture of 2-ethyl-hexanol and a $C_9$ aromatic solvent.

The Nitrogen-containing Detergent Additive

The cleaning composition employed in the present invention will also contain at least one nitrogen-containing detergent additive. Suitable detergent additives for use in this invention include, for example, aliphatic hydrocarbyl amines, hydrocarbyl-substituted poly(oxyalkylene) amines, hydrocarbyl-substituted succinimides, Mannich reaction products, nitro and amino aromatic esters of polyalkylphenoxyalkanols, polyalkylphenoxyaminoalkanes, and mixtures thereof.

The aliphatic hydrocarbyl-substituted amines which may be employed in the present invention are typically straight or branched chain hydrocarbyl-substituted amines having at least one basic nitrogen atom and wherein the hydrocarbyl group has a number average molecular weight of about 700 to 3,000. Preferred aliphatic hydrocarbyl-substituted amines include polyisobutenyl and polyisobutyl monoamines and polyamines.

The aliphatic hydrocarbyl amines employed in this invention are prepared by conventional procedures known in the art. Such aliphatic hydrocarbyl amines and their preparations are described in detail in U.S. Pat. Nos. 3,438,757; 3,565,804; 3,574,576; 3,848,056; 3,960,515; 4,832,702; and 6,203,584, the disclosures of which are incorporated herein by reference.

Another class of detergent additives suitable for use in the present invention are the hydrocarbyl-substituted poly (oxyalkylene) amines, also referred to as polyether amines. Typical hydrocarbyl-substituted poly(oxyalkylene) amines include hydrocarbyl poly(oxyalkylene) monoamines and polyamines wherein the hydrocarbyl group contains from 1 to about 30 carbon atoms, the number of oxyalkylene units will range from about 5 to 100, and the amine moiety is derived from ammonia, a primary alkyl or secondary dialkyl monoamine, or a polyamine having a terminal amino nitrogen atom. Preferably, the oxyalkylene moiety will be oxypropylene or oxybutylene or a mixture thereof. Such hydrocarbyl-substituted poly(oxyalkylene) amines are described, for example, in U.S. Pat. No. 6,217,624 to Morris et al., and U.S. Pat. No. 5,112,364 to Rath et al., the disclosures of which are incorporated herein by reference.

A preferred type of hydrocarbyl-substituted poly (oxyalkylene) monoamine is an alkylphenyl poly (oxyalkylene)monoamine wherein the poly(oxyalkylene) moiety contains oxypropylene units or oxybutylene units or mixtures of oxypropylene and oxybutylene units. Preferably, the alkyl group on the alkylphenyl moiety is a straight or branched-chain alkyl of 1 to 24 carbon atoms. An especially preferred alkylphenyl moiety is tetrapropenylphenyl, that is, where the alkyl group is a branched-chain alkyl of 12 carbon atoms derived from propylene tetramer.

An additional type of hydrocarbyl-substituted poly (oxyalkylene)amine finding use in the present invention are hydrocarbyl-substituted poly(oxyalkylene) aminocarbamates disclosed for example, in U.S. Pat. Nos. 4,288,612; 4,236,020; 4,160,648; 4,191,537; 4,270,930; 4,233,168; 4,197,409; 4,243,798 and 4,881,945, the disclosure of each of which are incorporated herein by reference.

These hydrocarbyl poly(oxyalkylene)aminocarbamates contain at least one basic nitrogen atom and have an average molecular weight of about 500 to 10,000, preferably about 500 to 5,000, and more preferably about 1,000 to 3,000. A preferred aminocarbamate is alkylphenyl poly(oxybutylene) aminocarbamate wherein the amine moiety is derived from ethylene diamine or diethylene triamine.

A further class of detergent additives suitable for use in the present invention are the hydrocarbyl-substituted succinimides. Typical hydrocarbyl-substituted succinimides include polyalkyl and polyalkenyl succinimides wherein the polyalkyl or polyalkenyl group has an average molecular weight of about 500 to 5,000, and preferably about 700 to 3,000. The hydrocarbyl-substituted succinimides are typically prepared by reacting a hydrocarbyl-substituted succinic anhydride with an amine or polyamine having at least one reactive hydrogen bonded to an amine nitrogen atom. Preferred hydrocarbyl-substituted succinimides include polyisobutenyl and polyisobutanyl succinimides, and derivatives thereof.

The hydrocarbyl-substituted succinimides finding use in the present invention are described, for example, in U.S. Pat. Nos. 5,393,309; 5,588,973; 5,620,486; 5,916,825; 5,954,843; 5,993,497; and 6,114,542, and British Patent No. 1,486,144, the disclosure of each of which are incorporated herein by reference.

Yet another class of detergent additives which may be employed in the present invention are Mannich reaction products which are typically obtained from the Mannich condensation of a high molecular weight alkyl-substituted hydroxyaromatic compound, an amine containing at least one reactive hydrogen, and an aldehyde. The high molecular weight alkyl-substituted hydroxyaromatic compounds are preferably polyalkylphenols, such as polypropylphenol and polybutylphenol, especially polyisobutylphenol, wherein the polyakyl group has an average molecular weight of about 600 to 3,000. The amine reactant is typically a polyamine, such as alkylene polyamines, especially ethylene or polyethylene polyamines, for example, ethylene diamine, diethylene triamine, triethylene tetramine, and the like. The aldehyde reactant is generally an aliphatic aldehyde, such as formaldehyde, including paraformaldehyde and formalin, and acetaldehyde. A preferred Mannich reaction product is obtained by condensing a polyisobutylphenol with formaldehyde and diethylene triamine, wherein the polyisobutyl group has an average molecular weight of about 1,000.

The Mannich reaction products suitable for use in the present invention are described, for example, in U.S. Pat. Nos. 4,231,759 and 5,697,988, the disclosures of each of which are incorporated herein by reference.

A still further class of detergent additive suitable for use in the present invention are polyalkylphenoxyaminoalkanes. Preferred polyalkylphenoxyaminoalkanes include those having the formula:

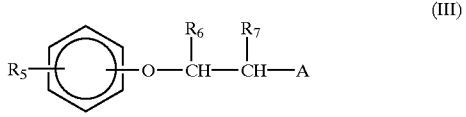

(III)

wherein $R_5$ is a polyalkyl group having an average molecular weight in the range of about 600 to 5,000;

$R_6$ and $R_7$ are independently hydrogen or lower alkyl having 1 to 6 carbon atoms; and A is amino, N-alkyl amino having about 1 to about 20 carbon atoms in the alkyl group, N,N-dialkyl amino having about 1 to about 20 carbon atoms in each alkyl group, or a polyamine moiety having about 2 to about 12 amine nitrogen atoms and about 2 to about 40 carbon atoms.

The polyalkylphenoxyaminoalkanes of Formula III above and their preparations are described in detail in U.S. Pat. No. 5,669,939, the disclosure of which is incorporated herein by reference.

Mixtures of polyalkylphenoxyaminoalkanes and poly(oxyalkylene) amines are also suitable for use in the present invention. These mixtures are described in detail in U.S. Pat. No. 5,851,242, the disclosure of which is incorporated herein by reference.

A preferred class of detergent additive finding use in the present invention are nitro and amino aromatic esters of polyalkylphenoxyalkanols. Preferred nitro and amino aromatic esters of polyalkylphenoxyalkanols include those having the formula:

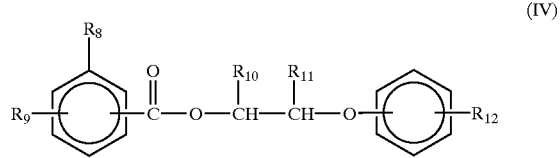

(IV)

wherein $R_8$ is nitro or $-(CH_2)_n-NR_{13}R_{14}$, wherein $R_{13}$ and $R_{14}$ are independently hydrogen or lower alkyl having 1 to 6 carbon atoms and n is 0 or 1;

$R_9$ is hydrogen, hydroxy, nitro or $-NR_{15}R_{16}$, wherein $R_{15}$ and $R_{16}$ are independently hydrogen or lower alkyl having 1 to 6 carbon atoms;

$R_{10}$ and $R_{11}$ are independently hydrogen or lower alkyl having 1 to 6 carbon atoms; and $R_{12}$ is a polyalkyl group having an average molecular weight in the range of about 450 to 5,000.

The aromatic esters of polyalkylphenoxyalkanols shown in Formula IV above and their preparations are described in detail in U.S. Pat. No. 5,618,320, the disclosure of which is incorporated herein by reference.

Mixtures of nitro and amino aromatic esters of polyalkylphenoxyalkanols and hydrocarbyl-substituted poly(oxyalkylene) amines are also preferably contemplated for use in the present invention. These mixtures are described in detail in U.S. Pat. No. 5,749,929, the disclosure of which is incorporated herein by reference.

Preferred hydrocarbyl-substituted poly(oxyalkylene) amines which may be employed as detergent additives in the present invention include those having the formula:

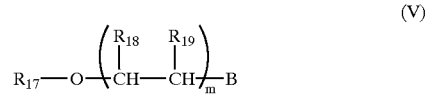

(V)

wherein:

$R_{17}$ is a hydrocarbyl group having from about 1 to about 30 carbon atoms;

$R_{18}$ and $R_{19}$ are each independently hydrogen or lower alkyl having about 1 to about 6 carbon atoms and each $R_{18}$ and $R_{19}$ is independently selected in each $-O-CHR_{18}-CHR_{19}-$ unit;

B is amino, N-alkyl amino having about 1 to about 20 carbon atoms in the alkyl group, N,N-dialkyl amino having about 1 to about 20 carbon atoms in each alkyl group, or a polyamine moiety having about 2 to about 12 amine nitrogen atoms and about 2 to about 40 carbon atoms; and m is an integer from about 5 to about 100.

The hydrocarbyl-substituted poly(oxyalkylene) amines of Formula V above and their preparations are described in detail in U.S. Pat. No. 6,217,624, the disclosure of which is incorporated herein by reference.

The hydrocarbyl-substituted poly(oxyalkylene) amines of Formula V are preferably utilized either by themselves or in combination with other detergent additives, particularly with the polyalkylphenoxyaminoalkanes of Formula III or the nitro and amino aromatic esters of polyalkylphenoxyalkanols shown in Formula IV. More preferably, the detergent additives employed in the present invention will be combinations of the hydrocarbyl-substituted poly(oxyalkylene) amines of Formula V with the nitro and amino aromatic esters of polyalkylphenoxyalkanols shown in Formula IV. A particularly preferred hydrocarbyl-substituted poly(oxyalkylene) amine detergent additive is dodecylphenoxy poly(oxybutylene) amine and a particularly preferred combination of detergent additives is the combination of dodecylphenoxy poly(oxybutylene) amine and 4-polyisobutylphenoxyethyl para-aminobenzoate.

Another type of detergent additive suitable for use in the present invention are the nitrogen-containing carburetor/injector detergents. The carburetor/injector detergent additives are typically relatively low molecular weight compounds having a number average molecular weight of about 100 to about 600 and possessing at least one polar moiety and at least one non-polar moiety. The non-polar moiety is typically a linear or branched-chain alkyl or alkenyl group having about 6 to about 40 carbon atoms. The polar moiety is typically nitrogen-containing. Typical nitrogen-containing polar moieties include amines (for example, as described in U.S. Pat. No. 5,139,534 and PCT International Publication No. WO 90/10051), ether amines (for example, as described in U.S. Pat. No. 3,849,083 and PCT International Publication No. WO 90/10051), amides, polyamides and amide-esters (for example, as described in U.S. Pat. Nos. 2,622,018; 4,729,769; and 5,139,534; and European Patent Publication No. 149,486), imidazolines (for example, as described in U.S. Pat. No. 4,518,782), amine oxides (for example, as described in U.S. Pat. Nos. 4,810,263 and 4,836,829), hydroxyamines (for example, as described in U.S. Pat. No. 4,409,000), and succinimides (for example, as described in U.S. Pat. No. 4,292,046).

The Cyclic Carbonate

Preferred cyclic carbonates include those having the formula:

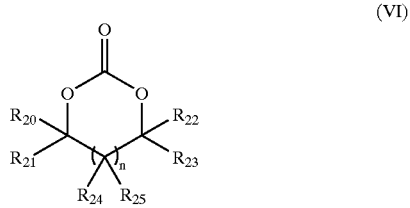

(VI)

wherein:

$R_{20}$, $R_{21}$, $R_{22}$, $R_{23}$, $R_{24}$, and $R_{25}$ are independently selected from hydrogen, hydroxy, hydroxymethyl, hydroxyethyl, hydrocarbyl group from about 1 to 6 carbon atoms; n is an integer from zero to one. Preferably, $R_{20}$, $R_{21}$, $R_{22}$, $R_{23}$, $R_{24}$, $R_{25}$ are hydrogen or lower alkyl of 1 to 2 carbon atoms, and more preferably hydrogen or methyl.

Preferred cyclic carbonates for use in this invention are those of formula 1 above where n is zero and where $R_{20}$, $R_{21}$, $R_{22}$ are hydrogen and $R_{23}$ is methyl, ethyl or hydroxymethyl. Preferably when n is 1, $R_{21}$, $R_{22}$, $R_{23}$, $R_{24}$, $R_{25}$ are hydrogen. Most preferred are ethylene carbonate, propylene carbonate and the butylene carbonates which are defined below.

The following are examples of suitable cyclic carbonates for use in this invention as well as mixtures thereof: 1,3-dioxolan-2-one (also referred to as ethylene carbonate); 4-methyl-1,3-dioxolan-2-one (also referred to as propylene carbonate); 4-hydroxymethyl-1,3-dioxolan-2-one; 4,5-dimethyl-1,3-dioxolan-2-one; 4-ethyl-1,3-dioxolan-2-one; 4,4-dimethyl-1,3-dioxolan-2-one (previous three also referred to as butylenes carbonates); 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5,5-dihydroxymethyl-1,3-dioxan-2-one; 5-methyl-1,3-dioxan-2-one; 4-methyl-1,3-dioxan-2-one; 5-hydroxy-1,3-dioxan-2-one; 5-hydroxymethyl-5-methyl-1,3-dioxan-2-one; 5,5-diethyl-1,3-dioxan-2-one; 5-methyl-5-propyl-1,3-dioxan-2-one; 4,6-dimethyl-1,3-dioxan-2-one; and 4,4,6-trimethyl-1,3-dioxan-2-one. Other suitable cyclic carbonates may be prepared from visconal diols prepared from $C_1-C_{30}$ olefins by methods known in the art.

Several of these cyclic carbonates are commercially available such as 1,3-dioxolan-2-one or 4-methyl-1,3-dioxolan-2-one sold for example by Lyondell Chemical Company under the trade name ARCONATE. Alternatively, Huntsman Performance Chemicals also sells, ethylene carbonate, propylene carbonate, 1,2 butylene carbonate as well as mixtures thereof under the trade name JEFFSOL. Cyclic carbonates may be readily prepared by known reactions. For example although not preferred, reaction of phosgene with a suitable alpha alkane diol or an alkan-1,3-diol yields a carbonate for use within the scope of this invention as for instance in U.S. Pat. No. 4,115,206 which is incorporated herein by reference.

Likewise, the cyclic carbonates useful for this invention may be prepared by transesterification of a suitable alpha alkane diol or an alkan-1,3-diol with, e.g., diethyl carbonate under transesterification conditions. See, for instance, U.S. Pat. Nos. 4,384,115 and 4,423,205 which are incorporated herein by reference for their teaching of the preparation of cyclic carbonates. Catalytic processes employing Cr(III)- and Co(III)-based catalyst system can also be used for synthesis of cyclic carbonates from the coupling of $CO_2$ and terminal epoxides under mild conditions. For example, propylene oxide reacts with $CO_2$ in the presence of these complexes to afford propylene carbonate quantitatively. The reaction can be run with or without solvent, at modest temperatures (25–100° C.), $CO_2$ pressures (1–5 atm), and low catalyst level (0.075 mol %).

As used herein, the term "alpha alkane diol" means an alkane group having two hydroxyl substituents wherein the hydroxyl substituents are on adjacent carbons to each other. Examples of alpha alkane diols include 1,2-propanediol, 2,3-butanediol and the like. Likewise, the term "alkan-1,3-diol" refers to an alkane group having two hydroxyl substituents wherein the hydroxyl substituents are beta substituted. That is, there is a methylene or a substituted methylene moiety between the hydroxyl substituted carbons. Examples of alkan-1,3-diols include propan-1,3-diol, pentan-2,4-diol and the like.

The alpha alkane diols, used to prepare the 1,3-dioxolan-2-ones employed in this invention, are either commercially available or may be prepared from the corresponding olefin by methods known in the art. For example, the olefin may first react with a peracid, such as peroxyacetic acid or hydrogen peroxide to form the corresponding epoxide which is readily hydrolyzed under acid or base catalysis to the alpha alkane diol. In another process, the olefin is first halogenated to a dihalo derivative and subsequently hydrolyzed to an alpha alkane diol by reaction first with sodium acetate and then with sodium hydroxide. The olefins so employed are known in the art.

The alkan-1,3-diols, used to prepare the 1,3-dioxan-2-ones employed in this invention, are either commercially available or may be prepared by standard techniques, e.g., derivatizing malonic acid.

4-Hydroxymethyl 1,3-dioxolan-2-one derivatives and 5-hydroxy-1,3-dioxan-2-one derivatives may be prepared by employing glycerol or substituted glycerol in the process of U.S. Pat. No. 4,115,206. The mixture so prepared may be separated, if desired, by conventional techniques. Preferably the mixture is used as is.

5,5-Dihydroxymethyl-1,3-dioxan-2-one may be prepared by reacting an equivalent of pentaerythritol with an equivalent of either phosgene or diethylcarbonate (or the like) under transesterification conditions. 5-hydroxymethyl-5-methyl-1,3-dioxan-2-one may be prepared by reacting an equivalent of trimethylolethane with an equivalent of either phosgene or diethylcarbonate (or the like) under transesterification conditions.

Formulation

As described above, the cleaning composition employed in the present invention comprises a first and second cleaning solution. The first solution comprises a mixture of (a) a phenoxy mono- or poly(oxyalkylene) alcohol, (b) at least one solvent selected from (1) an alkoxy aliphatic alcohol and (2) an aliphatic or aromatic organic solvent, and (c) at least one nitrogen-containing detergent additive. The first solution will generally contain (a) about 10 to 70 weight percent, preferably about 10 to 50 weight percent, more preferably about 15 to 45 weight percent, of the phenoxy mono- or poly(oxyalkylene) alcohol, (b) about 5 to 50 weight percent, preferably 10 to 30 weight percent, more preferably about 15 to 25 weight percent, of the solvent or mixture of solvents, and (c) about 1 to 60 weight percent, preferably 10 to 50 weight percent, more preferably about 15 to 45 weight percent, of the detergent additive or mixture of additives. When the solvent component is a mixture of an aliphatic alcohol and an aliphatic or aromatic organic solvent, the cleaning composition will generally contain about 5 to 30 weight percent, preferably about 5 to 15 weight percent of the aliphatic alcohol and about 5 to 30 weight percent, preferably 5 to 15 weight percent of the aliphatic or aromatic organic solvent. When the detergent component contains the preferred combination of a poly(oxyalkylene) amine and an aromatic ester of a polyalkylphenoxyalkanol, the cleaning composition will generally contain about 0.5 to 45 weight percent, preferably 8 to 40 weight percent of the poly(oxyalkylene) amine and about 0.5 to 15 weight percent, preferably 1 to 10 weight percent of the aromatic ester of a polyalkylphenoxyalkanol.

As mentioned above, the second cleaning solution comprises a homogeneous mixture of (a) a phenoxy mono- or poly(oxyalkylene) alcohol, (b) a cyclic carbonate, and (c) water.

The phenoxy mono- or poly(oxyalkylene) alcohol component of the second solution will be a compound or mixture of compounds of Formula I above, and may be the same or different from the phenoxy mono- or poly(oxyalkylene) alcohol component of the initial cleaning composition. The second cleaning solution will generally contain (a) about 5 to 95 weight percent, preferably about 20 to 85 weight percent, of the phenoxy mono- or poly(oxyalkylene) alcohol, (b) about 5 to 95 weight percent, preferably about 5 to 50 weight percent, of the cyclic carbonate, and (c) about 5 to 25 weight percent, preferably about 5 to 20 weight percent, of water.

The first and second solutions can be assembled as a formulation in separate containers. Accordingly, these interrelated component parts can be assembled together as a kit which can be assembled for use in the field. In one aspect for example, the second solution can be shipped without the addition of water, which can be added prior to use in the field by the end user or other intermediate. However, in order to maintain optimum blends it is preferred to fully formulate the first and second solutions in the kit. The components within the first and second cleaning compositions are homogeneous and stable as separate solutions. When the first and second solutions are mixed and agitated they form an emulsion which is substantially stable during the time required to introduce said cleaning composition into an air intake manifold, but may separate into discrete liquid phases over time. When mixed it is desirable to use the cleaning composition within a short time afterward for optimum performance. The mixed cleaning composition may have a shorter shelf life due to chemical reactions between the components of the first solution with the second solution. For example cyclic carbonates can react with the nitrogen containing detergent additive, for example with unhindered amines such as primary amines and some secondary amines to a carbamic esters or with hindered secondary amines to form hydroxyalklene amines.

Preferred Application Tools and Procedures

Several generic approaches were developed to clean these problematic areas often focusing on the fuel systems in conjunction with the cleaning composition of the present invention. One common method is applying a cleaning solution directly to the carburetor into an open air throttle or the intake manifold of a fuel injection system, where the cleaner is admixed with combustion air and fuel, and the combination mixture is burned during the combustion process. One such option is employing aerosol sprays of the first and second solutions or a mixed first and second cleaning composition; however, due to the relatively high viscosities of the cleaning solutions other methods are preferred. Typically carburetor-cleaning aerosol spray cleaning products are applied to soiled areas into a running engine. The relatively slow delivery rate as well as the structure of the carburetor/manifold systems generally prevent the accumulation of cleaning liquid in the intake of the engine. However as is apparent for the intake manifold, the majority of the cleaner will take the path of least resistance to the closest combustion chamber of the engine often leading to poor distribution and minimal cleaning of some cylinders. In such situations an alternate delivery method to the air intake manifold is desired.

One approach is to use a pressurized container to drive the cleaning composition to the air intake manifold. One such suitable device is a commercially available apparatus which atomizes the formulations upstream of the throttle plate assembly. The commercially available apparatus consists of a pressurized container, a regulator, a flow control valve, and a nozzle to achieve a spray jet and which can be used to administer the cleaning composition to the intake manifold upstream of the throttle plate. Such a device is exemplified herein and is particularly suited for PFI and carbureted gasoline engines.

Another technique introduces a cleaning solution to the intake manifold through a vacuum fitting. Generally, these cleaning solutions are provided in non-aerosol form, introduced into a running engine in liquid form using engine vacuum to draw the product into the engine, as described in U.S. Pat. No. 5,858,942 issued Jan. 12, 1999. While these newer products and formulations may be generally more effective at cleaning the engine than the conventional solvent based (toluene, benzene, etc.,) aerosol cleaners, they largely do not achieve the degree of cleaning as the present two solution cleaning composition of this invention. Additionally this approach suffers from a distribution problem in getting the cleaner to the multiple intake runners, intake ports, intake valves, combustion chambers, etc. Generally, the cleaning product was introduced into the intake manifold via a single point by disconnecting an existing vacuum line on the manifold and connecting a flex line from that vacuum point to a container containing the cleaning liquid and using engine vacuum to deliver the cleaning solution to that single port. While a metering device could be used to limit the rate at which the cleaning solution was added to the intake manifold, the locations for addition of cleaning solution were fixed by the engine design of vacuum fittings on the intake manifold. Often such arrangements favored introduction of cleaning solution to some of the cylinders while others received less or none of the cleaning solution. More problematic is that some engine designs have an intake manifold floor, plenum floor or resonance chamber, which has a portion lower than the combustion chamber of the engine. This type of design will allow for cleaning solution to pool in these areas. This aspect, as well as introducing the cleaning solution at too great a rate, can accumulate and pool the cleaning solution in the manifold even though the engine is running. Generally, the vacuum generated within the manifold is not sufficient to immediately move this pooled liquid or atomize the liquid for introduction into the combustion chamber. However, upon subsequent operation of the engine or at higher engine speed, a slug of this liquid can be introduced into the combustion chamber. If sufficient liquid is introduced into the combustion chamber, hydraulic locking and/or catastrophic engine failure can result. Hydraulic locking and engine damage can result when a piston of the running engine approaches its fully extended position towards the engine head and is blocked by essentially an incompressible liquid. Engine operation ceases and engine internal damage often results.

A modification to this approach further employs a tube which is inserted inside the engine to be treated and preferably downstream from the throttle plate (if present). Such a device is further described below. The application tools for delivering the additive components of the cleaning composition comprise a reservoir, (which may be a regular or graduated bottle/container; either under atmospheric pressure or pressurized), a metering valve or orifice to control the flow rate of the additive composition, and a tube for uniform distribution of the product inside the intake system and ports. The essential component of the applicator is the tube, which depending on the engine geometry could be fabricated from either rigid or flexible material. Delivery of the additive composition components via this tube could also vary. For example, the tube could be marked to allow traversing between different intake ports or it could have single or multiple holes or orifices machined along its length to eliminate the need to traverse.

In the case of a DISI engine, the tube is inserted inside the PCV (positive crankcase ventilation) rail. The additive composition components could then be either pressure fed or delivered under engine intake vacuum. The tube inserted inside the PCV rail will allow precise and uniform delivery of the additive composition upstream of each intake port for maximum deposit clean up efficiency.

The clean-up procedure is carried out in a fully warmed-up engine and while the engine is running at speeds ranging from manufacturer recommended idle speed to about 3000 RPM. The additive composition flow rate could be controlled to allow a wide range of delivery time. Flow rates ranging from about 10 to 140 ml/min are typically employed, although slower rates below 10 ml/min can be used as well.

In a conventional PFI SI engine, the tube is inserted inside the intake manifold or the intake system via a vacuum line. It is most preferred that the additive composition system gets delivered under pressure using a single or multiple hole nozzle design to achieve optimum distribution of the additive composition. The remainder of the procedures are similar to those described above for the DISI application.

Although automotive engines are exemplified and used herein, the methods and apparatus for their use are not limited to such, but can be used in internal combustion engines including trucks, vans, motorboats, stationary engines, locomotive, etc. One embodiment is directed to engines capable of developing an intake manifold vacuum while running at or slightly above idle speeds. If the engine does not develop manifold vacuum or to improve fluid delivery, the apparatus could be pressurized to deliver the product, thus not relying on engine vacuum. The cleaning apparatus includes a reservoir container for holding the cleaning fluids.

These fluids can be a cleaning composition, or a plurality of cleaning compositions applied sequentially. The reservoir can be square, cylindrical or of any suitable shape, manufactured of any chemically resistant material. Transparent or translucent materials are preferred in one aspect since an operator can easily ascertain the quantity and flowrate of fluid dispensed. Additionally, a graduated or otherwise marked reservoir can be utilized to aid in control of the fluid addition.

The reservoir container has a neck and optionally a sealing system such as a threaded cap, cork, plug, valve, or the like which can be removed to provide a re-filling opening upon removal. Such sealing system also can have an integral vent to displace the fluid removed during operation. When the liquid is removed by the vacuum formed through engine suction, the vent can be an air vent and prevent a rigid container from collapsing. Alternatively, the vent could be attached to a pressure source.

In one operation, the fluid is transferred from the container to the desired treatment location using the engine. Engine suction (i.e., vacuum generated by a running engine) is used to dispense the fluid in the reservoir container when the device is in operation and connected to a vacuum port of the engine. The reservoir container has a flexible or fixed siphon tube extending downward terminating towards the bottom of the container. The siphon tube is in fluid contact with fluids held within the container. The siphon tube can be fixed to the wall of the reservoir container, fixed to the sealing system, or freely removable from the neck. The siphon tube, upon exiting the reservoir container, is optionally connected to an adjustable valve useful for flow proportioning; and is in communication with a flexible conduit or hose having the proximal portion attached to the siphon tube or the valve when present. The distal portion of the flexible conduit is connected to a treatment manifold which is inserted inside the engine through the intake air system via a vacuum port or otherwise during operation. A seal having a fluid opening therethrough is located between the treatment manifold and the flexible conduit to provide a vacuum seal with the engine while allowing the treatment fluids to flow to the engine.

The treatment manifold allows for uniform distribution of the cleaning composition(s) inside the intake system, runners and ports. The treatment manifold is designed depending upon the engine type, geometry and available intake access including vacuum ports. Accordingly, the treatment manifold may be rigid or flexible, constructed of suitable materials compatible with the cleaning fluids and engine operating conditions. However, the treatment manifold is sized with the constraints that a portion of the treatment manifold enters the engine cavity. Nonlimited locations include the intake opening, vacuum port openings, such as PCV ports, brake booster ports, air conditioning vacuum ports, etc. Delivery of the cleaning compositions via this treatment manifold can also vary. For example, the manifold can have a single opening having optional marking indicative of intake port location and allow for traversing between different intake ports such as: the A and B ports on a multi-valve engine, or a common A/B port leading to a single combustion chamber, or for traversing to intake ports which lead to different combustion chambers. Alternatively, the treatment manifold can contain multiple holes or orifices machined along its length. These multiple orifices can be of differing sizes to improve distribution at one or more locations. Multiple orifices can also serve to reduce or eliminate the need for such traverse. The location of the orifices can correlate to the inlet runners, thereby achieving optimal distribution of the cleaning composition.

The treatment manifold can also consist of multiple tubes attached to flexible conduit where the tubes can be directed dependently or independently to the desired treatment location either through the same or different vacuum points at the engine intake manifold. These multiple tubes can have holes or orifices machined along their length to dispense fluids to a single or to multiple intake ports. The multiple tubes can be constructed of various internal diameters to compensate for the variable vacuum motive force and flow profile at the various orifices. To aid in distribution of the fluid from the open tube orifices, the distal portion of the tube can be optionally fitted with a nozzle to produce a fog or otherwise improve spray distribution.

A multi-port apparatus can also be used for introducing cleaning compositions into the interior cavity of an engine to be treated. Typically, multi-port engines have an air intake manifold which can have a plurality of intake runners leading from the air intake to the combustion chamber. The air intake manifold may also have various access points such as the throttle body, vacuum ports, PCV ports, as well as other connections which are of suitable size to allow for insertion of the transport means, exemplified by the treatment manifold, inside the engine cavity. One such port is a PCV rail or PCV port which is in communication with at least one intake runner typically through an open orifice from the PCV rail to the intake runner(s). A treatment manifold, having a plurality of orifices can then be inserted into the PCV rail where optionally, the orifices on the treatment manifold correlate to the orifices on the PCV rail. If necessary, this treatment manifold can traverse the PCV rail. The treatment manifold can optionally be sealed with a plug within the PCV rail to allow for engine vacuum to draw the cleaning composition from the reservoir container.

In operation, the apparatus of this invention can be mounted in any suitable location in proximity to the engine to be treated. A suitable passageway position for the introduction of the treatment components within the air intake manifold is selected for the particular engine and in regard to the specific treatment manifold. For example, for the 1998 Mitsubishi Carisma equipped with a 1.8 L DISI engine, this DISI engine has a PCV rail accessible to the B ports of the intake valves. However, other engines with PCV valves in communication with an internal crankcase chamber of the engine to a PCV fitting on the air intake manifold could serve this purpose. Other locations identified but not preferred in this particular engine were the air inlet and the brake vacuum line. However, these may be preferred in other engines. To set up the apparatus, the engine hose connecting the PCV system is disconnected and the treatment manifold is inserted within this PCV rail with the remainder of the rail opening sealed by the sealing means. The cleaning procedure is preferably carried out on a fully warmed engine and while the engine is running at engine speeds ranging from the manufacturer recommended idle speed to approximately 3000 revolutions per minute (RPM). The cleaning composition is then introduced to the discrete engine locations requiring treatment via the treatment manifold. Some applications may require traverse of the manifold. If subsequent cleaning compositions are to be used, they are introduced in like fashion. The apparatus can be pre-calibrated to achieve the desired flowrate or field calibrated during operation. Additionally, such calibration and traverse can be automated. In a DISI engine, the intake portion from the PCV valve to the combustion chamber does not have contact with the fuel and tends to have increased engine deposits on the intake valves. As exemplified herein, the method and apparatus of this invention are directed to providing a solution to this issue.

In some larger engines including large bore diesels and large bore natural gas engines it may be preferred to modify the air intake manifold to provide access to the components to be cleaned. The intake can be drilled or otherwise modified to provide a suitable pathway for introduction of the cleaning composition.

The above apparatus was defined using engine vacuum generated within the air intake manifold as the fluid motive force. However, in a preferred aspect, the cleaning compositions can be introduced using a modified apparatus having an external pressure source to transfer the cleaning solution into the engine. This external pressure source can be a pressurized aerosol container, a pressurized gas (compressed air, nitrogen, etc.) or, alternatively, a pump can be connected in communication between the siphon tube and the flexible conduit. Suitable pumps for delivering and metering fluid flow are known in the art. Suitable pressurized systems are also available in the art and, for example, are described in U.S. Pat. Nos. 4,807,578 and 5,097,806; both incorporated herein by reference in their entirety. Generally, pressurized systems can lead to construction of components having smaller sized dimensions including thinner conduits that need to be placed within the engine (i.e., treatment manifold or other transfer conduits). Additionally, pressurized system can offer opportunities for increased fluid control at the manifold orifice(s). For example, these orifice(s) could be fitted with pressure compensating valves, flow restrictors, and various nozzles to improve the distribution of cleaning compounds. Aerosol pressurized systems are defined by having an aerosol container containing the cleaning composition which can be put into fluid communication with the treatment manifold. Pressurized gas systems use a regulated gas in contact with a pressure container containing the cleaning composition, wherein the pressurized gas displaces the fluid to a discharge end which is in fluid communication with the treatment manifold. Both of these systems can optionally contain a pressure regulator, flow valve, filter and shut off valve which can be configured to deliver the cleaning compositions to the desired engine treatment areas, as defined in the above apparatus.

In addition to the methods described above, the cleaning compositions employed in the present invention are also effective in cleaning up engine deposits if mixed directly with gasoline or diesel fuel. As a result, the cleaning compositions could be used to clean both two-stroke and four-stroke spark ignition and compression ignition engines using various types of commercially available applicators.

PREPARATIONS AND EXAMPLES

A further understanding of the invention can be had in the following nonlimiting Examples. Wherein unless expressly stated to the contrary, all temperatures and temperature ranges refer to the Centigrade system and the term "ambient" or "room temperature" refers to about 20° C. to 25° C. The term "percent" or "%" refers to weight percent and the term "mole" or "moles" refers to gram moles. The term "equivalent" refers to a quantity of reagent equal in moles, to the moles of the preceding or succeeding reactant recited in that example in terms of finite moles or finite weight or volume. Where given, proton-magnetic resonance spectrum (p.m.r. or n.m.r.) were determined at 300 mHz, signals are assigned as singlets (s), broad singlets (bs), doublets (d), double doublets (dd), triplets (t), double triplets (dt), quartets (q), and multiplets (m), and cps refers to cycles per second.

Example 1

Preparation of Polyisobutyl Phenol

To a flask equipped with a magnetic stirrer, reflux condenser, thermometer, addition funnel and nitrogen inlet was added 203.2 grams of phenol. The phenol was warmed to 40° C. and the heat source was removed. Then, 73.5 milliliters of boron trifluoride etherate was added dropwise. 1040 grams of Ultravis 10 Polyisobutene (molecular weight 950, 76% methylvinylidene, available from British Petroleum) was dissolved in 1,863 milliliters of hexane. The polyisobutene was added to the reaction at a rate to maintain the temperature between 22° C. to 27° C. The reaction mixture was stirred for 16 hours at room temperature. Then, 400 milliliters of concentrated ammonium hydroxide was added, followed by 2,000 milliliters of hexane. The reaction mixture was washed with water (3×2,000 milliliters), dried over magnesium sulfate, filtered and the solvents removed under vacuum to yield 1,056.5 grams of a crude reaction product. The crude reaction product was determined to contain 80% of the desired product by proton NMR and chromatography on silica gel eluting with hexane, followed by hexane: ethylacetate:ethanol (93:5:2).

Example 2

Preparation of

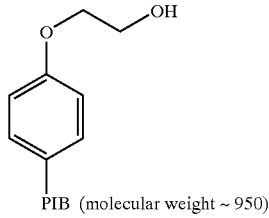

PIB (molecular weight ~ 950)

1.1 grams of a 35 weight percent dispersion of potassium hydride in mineral oil and 4-polyisobutyl phenol (99.7 grams, prepared as in Example 1) were added to a flask equipped with a magnetic stirrer, reflux condenser, nitrogen inlet and thermometer. The reaction was heated at 130° C. for one hour and then cooled to 100° C. Ethylene carbonate (8.6 grams) was added and the mixture was heated at 160° C. for 16 hours. The reaction was cooled to room temperature and one milliliter of isopropanol was added. The reaction was diluted with one liter of hexane, washed three times with water and once with brine. The organic layer was dried over anhydrous magnesium sulfate, filtered and the solvents removed in vacuo to yield 98.0 grams of the desired product as a yellow oil.

Example 3

Preparation of

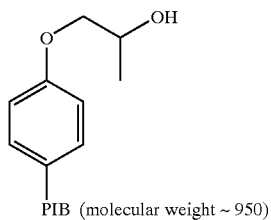

PIB (molecular weight ~ 950)

15.1 grams of a 35 weight percent dispersion of potassium hydride in mineral oil and 4-polyisobutyl phenol (1378.5 grams, prepared as in Example 1) were added to a flask equipped with a mechanical stirrer, reflux condenser, nitrogen inlet and thermometer. The reaction was heated at 130° C. for one hour and then cooled to 100° C. Propylene carbonate (115.7 milliliters) was added and the mixture was heated at 160° C. for 16 hours. The reaction was cooled to room temperature and ten milliliters of isopropanol were added. The reaction was diluted with ten liters of hexane, washed three times with water and once with brine. The organic layer was dried over anhydrous magnesium sulfate, filtered and the solvents removed in vacuo to yield 1301.7 grams of the desired product as a yellow oil.

Example 4

Preparation of

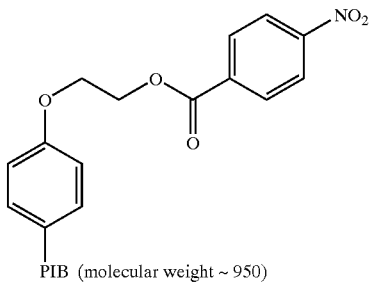

PIB (molecular weight ~ 950)

To a flask equipped with a magnetic stirrer, thermometer, Dean-Stark trap, reflux condenser and nitrogen inlet was added 15.0 grams of the alcohol from Example 2, 2.6 grams of 4-nitrobenzoic acid and 0.24 grams of p-toluenesulfonic acid. The mixture was stirred at 130° C. for sixteen hours, cooled to room temperature and diluted with 200 mL of hexane. The organic phase was washed twice with saturated aqueous sodium bicarbonate followed by once with saturated aqueous sodium chloride. The organic layer was then dried over anhydrous magnesium sulfate, filtered and the solvents removed in vacuo to yield 15.0 grams of the desired product as a brown oil. The oil was chromatographed on silica gel, eluting with hexane/ethyl acetate (9:1) to afford 14.0 grams of the desired ester as a yellow oil. $^1$H NMR (CDCl$_3$) d 8.3 (AB quartet, 4H), 7.25 (d, 2H), 6.85 (d, 2H), 4.7 (t, 2H), 4.3 (t, 2H), 0.7–1.6 (m, 137H).

Example 5

Preparation of

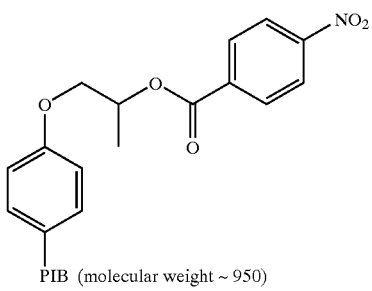

To a flask equipped with a magnetic stirrer, thermometer, Dean-Stark trap, reflux condenser and nitrogen inlet was added 15.0 grams of the alcohol from Example 3, 2.7 grams of 4-nitrobenzoic acid and 0.23 grams of p-toluenesulfonic acid. The mixture was stirred at 130° C. for sixteen hours, cooled to room temperature and diluted with 200 mL of hexane. The organic phase was washed twice with saturated aqueous sodium bicarbonate followed by once with saturated aqueous sodium chloride. The organic layer was then dried over anhydrous magnesium sulfate, filtered and the solvents removed in vacuo to yield 16.0 grams of the desired product as a brown oil. The oil was chromatographed on silica gel, eluting with hexane/ethyl acetate (8:2) to afford 15.2 grams of the desired ester as a brown oil. $^1$H NMR (CDCl$_3$) d 8.2 (AB quartet, 4H), 7.25 (d, 2H), 6.85 (d, 2H), 5.55 (hx, 1H), 4.1 (t, 2H), 0.6–1.8 (m, 140H).

Example 6

Preparation of

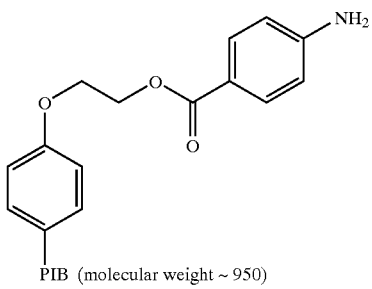

A solution of 9.4 grams of the product from Example 4 in 100 milliliters of ethyl acetate containing 1.0 gram of 10% palladium on charcoal was hydrogenolyzed at 35–40 psi for 16 hours on a Parr low-pressure hydrogenator. Catalyst filtration and removal of the solvent in vacuo yield 7.7 grams of the desired product as a yellow oil. $^1$H NMR (CDCl$_3$) d 7.85 (d, 2H), 7.3 (d, 2H), 6.85 (d, 2H), 6.6 (d, 2H), 4.6 (t, 2H), 4.25 (t, 2H), 4.05 (bs, 2H), 0.7–1.6 (m, 137H).

Example 7

Preparation of

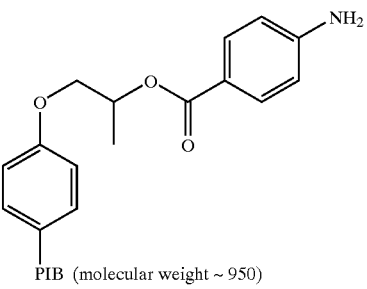

A solution of 15.2 grams of the product from Example 5 in 200 milliliters of ethyl acetate containing 1.0 gram of 10% palladium on charcoal was hydrogenolyzed at 35–40 psi for 16 hours on a Parr low-pressure hydrogenator. Catalyst filtration and removal of the solvent in vacuo yield 15.0 grams of the desired product as a brown oil. $^1$H NMR (CDCl$_3$/D$_2$O) d 7.85 (d, 2H), 7.25 (d, 2H), 6.85 (d, 2H), 6.6 (d, 2H), 5.4 (hx, 1H), 3.8–4.2 (m, 4H), 0.6–1.8 (m, 140H).

Example 8

Preparation of Dodecylphenoxy Poly(oxybutylene) poly(oxypropylene) Amine

A dodecylphenoxypoly(oxybutylene)poly(oxypropylene) amine was prepared by the reductive amination with ammonia of the random copolymer poly(oxyalkylene) alcohol, dodecylphenoxy poly(oxybutylene)poly(oxypropylene) alcohol, wherein the alcohol has an average molecular weight of about 1598. The poly(oxyalkylene) alcohol was prepared from dodecylphenol using a 75/25 weight/weight ratio of butylene oxide and propylene oxide, in accordance with the procedures described in U.S. Pat. Nos. 4,191,537; 2,782,240 and 2,841,479, as well as in Kirk-Othmer, "Encyclopedia of Chemical Technology", 4th edition, Volume 19, 1996, page 722. The reductive amination of the poly (oxyalkylene) alcohol was carried out using conventional techniques as described in U.S. Pat. Nos. 5,112,364; 4,609,377 and 3,440,029.

Example 9

Preparation of Dodecylphenoxy Poly(oxybutylene) Amine

A dodecylphenoxy poly(oxybutylene) amine was prepared by the reductive amination with ammonia of a dodecylphenoxy poly(oxybutylene) alcohol having an average molecular weight of about 1600. The dodecylphenoxy poly(oxybutylene) alcohol was prepared from dodecylphenol and butylene oxide, in accordance with the procedures described in U.S. Pat. Nos. 4,191,537; 2,782,240, and 2,841,479, as well as in Kirk-Othmer, "Encyclopedia of Chemical Technology", 4th edition, Volume 19, 1996, page 722. The reductive amination of the dodecylphenoxy poly (oxybutylene) alcohol was carried out using conventional techniques as described in U.S. Pat. Nos. 5,112,364; 4,609,377; and 3,440,029.

Example 10

Preparation of A Cleaning Composition

A cleaning composition was prepared as described herein. Regarding the preparation of the two part cleaning composition, the first cleaning solution incorporated 2-phenoxyethanol, 2-ethyl hexanol, a C₉ aromatic solvent and a detergent additive mixture in the weight percents indicated in Table 1.

TABLE 1

First Cleaning Solution

| Component | Weight % |
| --- | --- |
| Dodecylphenoxy Poly(oxybutylene) Amine | 35.5 |
| 4-Polyisobutylphenoxyethyl para-aminobenzoate | 2.6 |
| C9 aromatic solvent | 13.7 |
| 2-Phenoxyethanol | 42.2 |
| 2-Ethyl Hexanol | 6.0 |

The dodecylphenoxy poly(oxybutylene) amine was prepared as described in Example 9 and the 4-polyisobutylphenoxyethyl para-aminobenzoate was prepared as described in Example 6. The 2-phenoxyethanol is available from Dow Chemical Company as EPH Dowanol.

The second cleaning composition employed an aqueous solution containing 2-phenoxyethanol and propylene carbonate in the weight percents indicated in Table 2.

TABLE 2

Second Cleaning Solution

| Component | Weight % |
| --- | --- |
| 2-Phenoxyethanol | 47.5 |
| Propylene carbonate | 47.5 |
| Water | 5 |

Example 11

Performance Example—Gasoline Engines

Deposits in gasoline engines, namely port fuel injection spark ignition and direct injection spark ignition engines, were removed employing the cleaning composition described in Example 10 with the method outlined below.

PFI Engine Example

The method described below was used to achieve deposit removal in Port Fuel Injected (PFI) internal combustion engines using cleaning solution described above. The procedure was demonstrated in a 1996 GM LD9, 2.3 L engine dynamometer test stand.

Deposit formation and removal experiments were carried out using the following procedures:

The LD9 engine was assembled using all clean components.

The engine was operated for 100 hours to accumulate sufficient deposits.

After deposit formation phase was completed, the engine was disassembled and intake system and combustion chamber deposit thickness and weight were measured and recorded. The measured engine was then assembled for the clean up phase.

Deposit removal was performed after the engine was fully warmed up and while it was operating at fast idle (1500 RPM). A total of 650 ml of the two cleaning solutions of Example 10, (350 ml of each solution, added separately or combined) was delivered through the intake manifold using a commercially available apparatus which atomizes the formulations upstream of the throttle plate assembly. Total application time was approximately 25–35 minutes. The commercially available apparatus consists of a pressurized container, a regulator, a flow control valve, and a nozzle to achieve a spray jet. In situations where part one and two were combined, the injection pressure was set in the range of 30–60 psig. In some experiments, part one and part two were supplied separately, and since the two formulations have different viscosities, the pressure regulator was used to vary the supplied pressure to achieve appropriate flow rate for each product. In this situation, the first cleaning solution was applied at 40–60 psig, while second cleaning solution was applied at 15–30 psig.

Upon completion of the procedure, the engine was allowed to idle for 3–5 minutes before shutting down. To determine clean up performance, the engine was disassembled once again and intake system and combustion chamber deposit thickness and weight were measured. Also included within Table 3 is a comparative run (Run C) using the apparatus and method of the PFI engine with 650 ml of a commercially available engine deposit cleaner applied as above.

DISI Engine Example

The method described below was used to achieve deposit removal in Direct Injection Spark Ignition (DISI) internal combustion engines using the cleaning composition of Example 10. The procedure was demonstrated in a 1998 Mitsubishi Carisma vehicle equipped with a 1.8 L DISI engine.

Deposit formation and removal experiments were carried out using the following procedures:

The DISI engine was assembled using all clean components.

The vehicle was operated on mileage accumulator lane for 8000 kilometer to accumulate sufficient deposits.

After deposit formation phase, the engine was disassembled and intake system and combustion chamber deposit thickness and weight were measure and recorded. The measured engine was then assembled for the clean up phase.

Deposit removal was performed after the engine was fully warmed up and while it was operating at fast idle (2000 RPM), however, this procedure could be conducted at manufacturer recommended idle speeds to approximately 3500 RPM. In the case of this DISI engine, a convenient access point for discretely introducing the cleaning composition is the intake manifold; and more specifically, the positive crankcase ventilation (PCV) rail. This rail is in communication and in closer proximity to the inlet valves; allowing for a more concentrated cleaning composition to be administered upstream of each affected intake port and allowing for increased deposit removal. A transport means was inserted inside the PCV rail through the PCV port to the desired location to thereby deliver the cleaning composition to each intake port. This aspect used a flexible treatment manifold inserted inside the interior of the engine and having an outlet for transporting the fluid to the location. Coupled with the treatment manifold was a seal for sealing the remainder of the PCV port. The treatment manifold was marked to indicate the desired insertion depth. The treatment manifold allowed for traverse within the PCV rail, so that the treatment manifold outlet could correspond to each intake runner allowing the treatment composition to be evenly distributed amongst the cylinders. A flow control valve in communication with the transport means was set and adjusted to allow for a wide range of delivery of cleaning fluids ranging from about 10 to about 140 milliliters per minute.

In the present example, the flow control valve was adjusted to achieve a flow rate of approximately 30 ml/min under intake vacuum. After the flow rate was adjusted, the cleaning composition was distributed sequentially to the inlet ports using a proportional amount of the cleaning composition. In the case of successive cleaning compositions to be introduced, a similar operation as above, was undertaken. A total of 1150 ml of the two cleaning solutions of Example 10 was delivered (575 ml of each solution added sequentially) to the engine resulting in total application time of approximately 40 minutes. Upon completion of the procedure, the engine was allowed to idle for 3–5 minutes before shutting down. To determine clean up performance, the engine was disassembled once again and intake system and combustion chamber deposit thickness and weight were measured. Also included within Table 3 is a comparative run (Run E) using the apparatus and method of the DISI engine with 650 ml of a commercially available engine deposit cleaner applied at a flow rate of approximately 30 ml/min.

TABLE 3

PFI and DISI Experimental Data

| Run TYPE | Test Condition (before and after) | Average Intake Valve Deposit Weight (mg) | Average Piston Top Thickness ($\mu$m) | Average Cylinder Head Thickness ($\mu$m) |
|---|---|---|---|---|
| Run A PFI[1] | (dirty) | 231 | 118 | 170 |
| | (after cleanup) | 171 | 101 | 137 |
| Run B PFI[2] | (dirty) | 239 | 104 | 159 |
| | (after cleanup) | 190 | 84 | 134 |
| Comparative Run C PFI | (dirty) | 202 | 105 | 134 |
| | (after cleanup) | 263 | 103 | 101 |
| Run D DISI[3] | (dirty) | 269 | 218 | 293 |
| | (after cleanup) | 131 | 50 | 108 |
| Comparative Run E DISI | (dirty) | 215 | 198 | 237 |
| | (after cleanup) | 135 | 248 | 218 |

[1]Cleaning solutions 1 and 2 applied separately
[2]Cleaning solutions 1 and 2 applied together
[3]Cleaning solutions 1 and 2 applied separately

TABLE 4

PFI and DISI Results

| Test | % Intake Valve Clean-up | % Piston Top Clean-up | % Cylinder Head Clean-up |
|---|---|---|---|
| Run A (PFI) | 25.8 | 14.4 | 19.4 |
| Run B (PFI) | 20.7 | 19.2 | 15.7 |
| Run C (PFI) Comparative | −29.8[4] | 2.1 | 24.7 |
| Run C (DISI) | 51.1 | 77.1 | 63.1 |
| Run D (DISI) (Comparative) | 37 | 8 | 8 |

[4]No cleanup performance observed; deposit level increased.

The experimental data in Table 4 display engine cleanliness as a calculated percent clean-up based upon the before and after results exemplified by this example. The percent clean-up value is calculated based upon (dirty component—cleaned component)/dirty component multiplied by 100 to yield the percent clean-up of the component. As can be seen, the cleaning compositions employed in this invention provided a significant reduction in intake system and combustion chamber deposits in both PFI and DISI engines. In Comparative Run C (PFI engine), the commercially available product provided some combustion chamber cleanup performance, however, it did not provide any intake valve clean up (intake valve deposits increased after the procedure). While not being to any theory, it appears that the main reason for the above observation could be that the cleaning composition removed deposits from other intake system components upstream of the intake valves and was not effective enough to completely solublize and remove these deposits from the engine. As a result, deposit particles suspended in the solution were left behind on the intake valves during the air induction stroke.

Example 12

Performance Example—Diesel Engine

The cleaning composition of Example 10 was also used to achieve deposit removal in a 2001, Ford HSDI 2.0 diesel engine. The engine was installed on a dynamometer engine stand. Prior to the clean up test, the engine cylinder head was removed and intake valve, piston top and cylinder head deposits were measured and recorded. Clean up procedure was performed using part 1 and part 2 formulations sequentially. Before the experiments, the engine was fully warmed up while running at 2500 RPM. In these experiments, two different engine speeds were tried (850 and 2400 RPM), however, 2400 RPM resulted in a more stable engine operation than 850 RPM. The two formulations were delivered inside the intake manifold system using a rail with eight nozzles, fed by a heating pump for better distribution of the products. After completion of the test, engine was allowed to run for approximately 10 minutes before shutting down. Deposit removal efficacy was determined by disassembling engine's cylinder head and measuring deposit weight and thickness. The engine cleanup performance was measured and calculated as described in Table 4. The results are as follows: the percent intake valve deposit cleanup improved by 24.7% (average intake valve deposit weight 240 mg dirty vs 178 mg clean), the percent piston top cleanup improved by 41.5% (average piston top thickness 8.2 $\mu$m dirty vs 4.8 $\mu$m clean) and the percent cylinder head cleanup improved by 70.6% (average cylinder head thickness 108 $\mu$m dirty vs 10.2 $\mu$m clean. Thus clearly indicating the cleaning composition is effective in removing intake system and combustion chamber deposits from diesel engines.

Example 13

Performance Example—Natural Gas Engine

The cleaning composition of Example 10 was used to clean a large bore natural gas engine. Deposit removal experiment was performed in a stationary, 12 cylinder, Waukesha engine with a total displacement volume of 115 L. Engine manifold was minimally modified to allow product delivery inside the intake ports and close to the valve tulips using a rigid tube connected to the container holding the formulations. A needle valve was used to control the flow of the products for proper engine operation. Prior to the clean up experiment, it was verified through visual inspection using a video scope that the engine has accumulated a significant level of deposits inside the intake system and combustion chambers from hours of operation in a natural gas field. The engine was then warmed up at idle. The cleaning solutions were introduced inside the intake system sequentially and while the engine was idling. Upon completion of the test, deposit removal was assessed using the same video scope and without disassembling the engine. Visual inspection by trained technicians revealed a significant deposit removal (up to 100 percent) from both the intake system and combustion chamber surfaces.

What is claimed is:

1. A method for removing engine deposits in a reciprocating internal combustion engine which comprises introducing a cleaning composition into the air-intake manifold of a warmed-up and idling reciprocating internal combustion engine and running the engine while the cleaning composition is being introduced, said cleaning composition comprising:

a first solution comprising a mixture of:
(a) a phenoxy mono- or poly(oxyalkylene) alcohol having the formula:

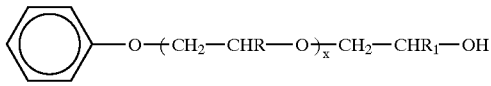

wherein R and $R_1$ are independently hydrogen or methyl and each R is independently selected in each —$CH_2$—CHR—O— unit; and x is an integer from 0 to 4; or mixtures thereof;
(b) at least one solvent selected from
(1) an aliphatic alcohol; and
(2) aliphatic or aromatic organic solvent wherein said at least one solvent is different from component a);
(c) at least one nitrogen-containing detergent additive; and a second solution comprising a mixture of:
(d) a phenoxy mono- or poly(oxyalkylene) alcohol having the formula:

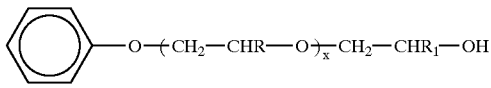

wherein R and $R_1$ are independently hydrogen or methyl and each R is independently selected in each —$CH_2$—CHR—O— unit; and x is an integer from 0 to 4; or mixtures thereof;
(e) a cyclic carbonate; and
(f) water.

2. The method according to claim 1 wherein the first solution and second solution are introduced sequentially.

3. The method according to claim 1 further comprising mixing the first solution with the second solution prior to introducing said cleaning composition.

4. The method according to claim 1, wherein R and $R_1$ in the phenoxy mono- or poly(oxyalkylene) alcohol are hydrogen and x is an integer from 0 to 2.

5. The method according to claim 1, wherein the phenoxy mono- or poly(oxyalkylene) alcohol is 2-phenoxyethanol.

6. The method according to claim 1, wherein the aliphatic solvent is a $C_6$ to $C_{20}$ alcohol.

7. The method according to claim 6, wherein the alcohol is 2-ethyl hexanol.

8. The method according to claim 7, wherein the solvent is a mixture of 2-ethyl hexanol and a $C_9$ aromatic solvent.

9. The method according to claim 1, wherein the solvent is a mixture of an aliphatic solvent and an aromatic organic solvent.

10. The method according to claim 1, wherein the detergent additive is a hydrocarbyl-substituted poly(oxyalkylene) amine.

11. The method according to claim 1, wherein the detergent additive is a nitro or amino aromatic ester of a polyakylphenoxyalkanol.

12. The method according to claim 1, wherein the detergent additive is a mixture of a hydrocarbyl-substituted poly(oxyalkylene) amine and a nitro or amino aromatic ester of a polyakylphenoxyalkanol.

13. The method according to claim 12, wherein the detergent additive is a mixture of dodecylphenoxypoly (oxbutylene) amine and 4-polyisobutylphenoxyethyl para-aminobenzoate.

14. The method according to claim 1, wherein
the first cleaning composition comprises (a) about 10 to 70 weight percent of the phenoxy mono- or poly (oxyalkylene) alcohol, (b) about 5 to 50 weight percent of the solvent or mixture of solvents, and (c) about 1 to 60 weight percent of the detergent additive or mixture of detergent additives; and
the second cleaning composition comprises (d) about 5 to 95 weight percent of the phenoxy mono- or poly (oxyalkylene) alcohol, (e) about 5 to 95 weight percent of the cyclic carbonate, and (f) about 5 to 25 weight of water.

15. The method according to claim 1, wherein the reciprocating internal combustion engine is selected from the group consisting of gasoline engines, diesel engines and natural gas engines.

16. The method according to claim 15, wherein the engine is a port fuel injected spark ignition gasoline engine.

17. The method according to claim 15, wherein the engine is a direct injection spark ignition gasoline engine.

18. The method according to claim 15, wherein the engine is a diesel engine.

19. The method according to claim 15, wherein the engine is a natural gas engine.

20. The method according to claim 15, wherein the reciprocating internal combustion engine further comprises at least one turbocharger, rotary pump, reciprocating pump or turbine.

21. The method according to claim 1, wherein the cleaning composition is introduced into the air intake manifold at a flow rate of about 10 to 140 milliliters per minute.

22. The method according to claim 1, wherein the cleaning composition is introduced into the air-intake manifold of the warmed-up and idling reciprocating internal combustion engine through a transport means inserted into and located within the interior of the engine to thereby deliver the cleaning composition to each cylinder of the engine, wherein the transport means is separate from the fuel delivery system of the engine.

23. The method according to claim 22, wherein the transport means is a rigid or flexible tube having a single opening or multiple orifices.

24. The method according to claim 23 wherein the cleaning composition is introduced under engine vacuum or an external pressure source.

25. A kit of component parts for a carbonaceous cleaning composition capable of being administered to an intake manifold of a reciprocating internal combustion engine comprising
a first container holding a solution comprising a mixture of:
(a) a phenoxy mono- or poly(oxyalkylene) alcohol having the formula:

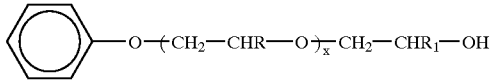

wherein R and $R_1$ are independently hydrogen or methyl and each R is independently selected in each —$CH_2$—CHR—O— unit; and x is an integer from 0 to 4; or mixtures thereof;
(b) at least one solvent selected from
  (1) an aliphatic alcohol; and
  (2) aliphatic or aromatic organic solvent wherein said at least one solvent is different from component a);
(c) at least one nitrogen-containing detergent additive; and a second container holding a solution comprising a mixture of:
(d) a phenoxy mono- or poly(oxyalkylene) alcohol having the formula:

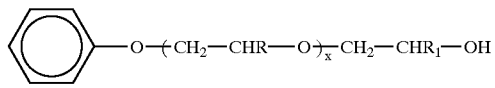

wherein R and $R_1$ are independently hydrogen or methyl and each R is independently selected in each —$CH_2$—CHR—O— unit; and x is an integer from 0 to 4; or mixtures thereof;
(e) a cyclic carbonate; and
(f) water.

26. The kit of claim 25 further comprising a pressurizable container adapted to deliver the cleaning composition, said container having a conduit capable of communication between the cleaning composition and an air intake manifold of a reciprocating internal combustion engine requiring deposit removal.

27. The kit of claim 26 further comprising a transport means for coupling to said conduit, wherein said transport means is adapted for insertion into the interior of the engine to thereby deliver the cleaning composition to each cylinder of the engine.

* * * * *